Figure 1:
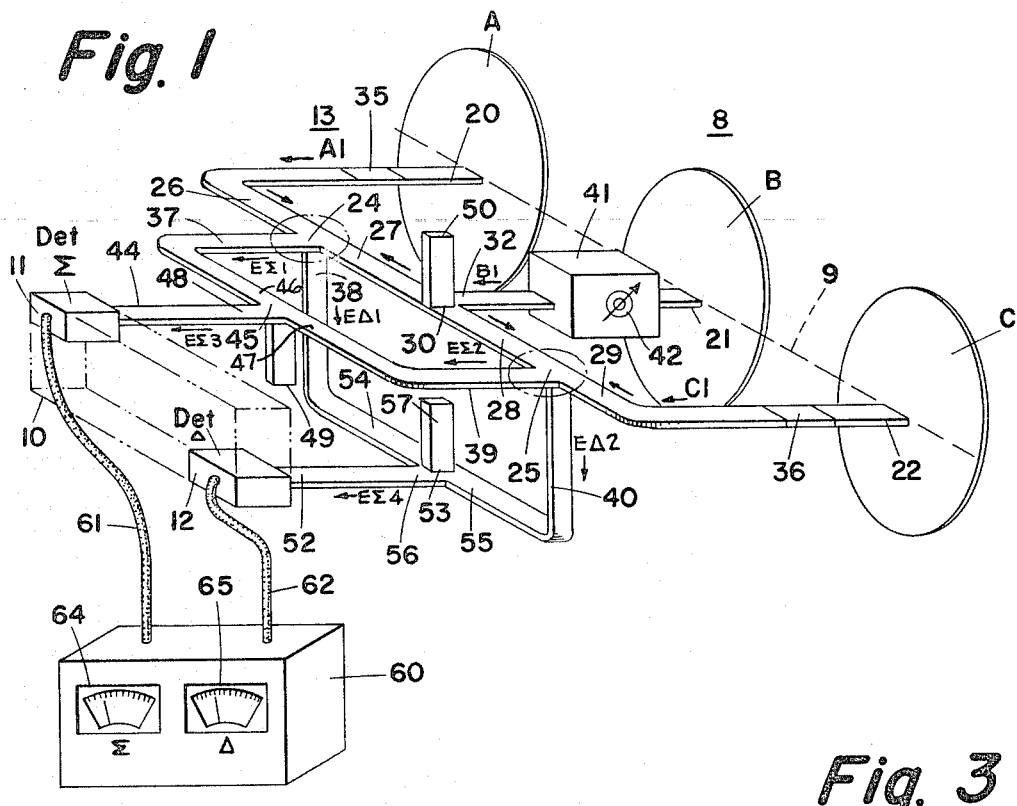

Feb. 7, 1967  V. D. STABILITO  3,303,503
SINGLE-SITE MONOPULSE RANGING SYSTEM
Filed Feb. 1, 1965  2 Sheets-Sheet 1

INVENTOR.
VINCENT D. STABILITO
BY Harry M. Saragovitz,
Edward J. Kelly, Herbert Berl
& S. Dubroff
ATTORNEYS

United States Patent Office 3,303,503
Patented Feb. 7, 1967

3,303,503
SINGLE-SITE MONOPULSE RANGING SYSTEM
Vincent D. Stabilito, Delran, N.J., assignor to the United States of America as represented by the Secretary of the Army
Filed Feb. 1, 1965, Ser. No. 429,688
7 Claims. (Cl. 343—112)

The invention described herein may be manufactured and used by or for the Government for governmental purposes without the payment to me of any royalty thereon.

The present invention relates to a phase-comparison or monopulse ranging system for the detection and location of sources of electromagnetic radiation, and in particular for the determination of range and azimuth to a distant, active, microwave source. In accordance with the invention, this information is obtained by alignment of the antenna elements with the phase contour of the intercepted radiation and by measuring the hereinafter explained sum and difference signals derived therefrom.

Complexed triangulation systems have been proposed in an effort to recover accurate range information, and require the use of two or more receiving sites fixed at distances many miles apart as a base line. The long base line is required in order to achieve the required accuracy and range and involves the usual problems associated with data transmission and general communication over long distances.

It is an object of this invention to provide an improved single-site monopulse ranging system for the detection and location of distant sources of electromagnetic radiation which overcomes the inherent weaknesses embodied in the various triangulation-correlation systems heretofore in use.

It is a further object of this invention to provide an improved single-site, phase-comparison or monopulse phase-contour ranging system for the detection and location of sources of electromagnetic radiation and particularly to determine the range of an active microwave source by antenna alignment with the spherical, phase contour of the intercepted radiation.

It is also a further object of this invention, to provide an improved ranging system of the type referred to embodying a single-site phase-comparison monopulse antenna configuration which, when properly oriented, will indicate both range and azimuth to a source, such as a transmitter, radiating electromagnetic energy.

In accordance with one form of the invention, a triple-in-line paraboloid antenna array is provided with the feed centers of the two end antenna elements displaced in the azimuth plane to provide sum and difference or even and odd functions of the received signals and is connected with a dual channel receiver with detectors and indicator elements responsive to the sum and the difference signals. The antenna array is rotatable on a vertical axis and range information from an active source of radiation may be recovered as follows. If a broad side array of three equally spaced in-line antenna elements is aimed at a source of radiation, the signal with which the center antenna element will be excited will lead that with which the two end antenna elements will be excited. As long as the source is a finite distance from the antenna array, the wave front will be spherical and detection and measurement of the phase lead of the signal received by the center antenna with respect to the others is indicative of the range of the source.

It is, therefore, a still further and important object of this invention to provide an improved single-site monopulse ranging system which permits the determination of range and direction simultaneously through the measurement of the curvature of the phase front of received electromagnetic radiation from a distant source.

Further in accordance with the invention, an electrical phase delay equal to the phase lead due to the wave-front curvature is inserted in the line coupling the output from the center antenna element, and contributions from the antenna elements are linearly combined in two groups of two, a simultaneous zero output being obtained when the source is exactly broadside to the antenna array.

With a continuous sweep of the phase shifter means over the equivalent ranges of interest, both range and azimuth information with respect to a moving source of signals can be acquired simultaneously. The rotation of the antenna array about the vertical axis gives the system full azimuth and multi signal source capability.

For combining the signal output from the three antenna elements in two groups of two, as above referred to, a preferred form of electronic phase shifter such as a hybrid-T or Magic-T is provided in a connection between the center antenna element and each of the outer antenna elements. Two pairs of coherent signal sources are thus connected with the input arms of the Magic-T's. The output signals from the sum and difference arms, which vary in accordance with the relative phase of the received signals, are again combined in two additional electronic phase shifters of the hybrid-T or Magic-T type to provide a resultant combined sum signal output and combined difference signal output. These resultant signals are both applied to receivers and detected for further application to indicator means for comparison of the sum and difference signal outputs of the system. The hybrid-T or Magic-T phase shifter, when employed in the specific manner of the present invention, converts relative phase to relative energy so as to render signal processing to the realm of voltage comparison in the indicator means referred to.

When the sum signals arising from the combination of the center and left hand antenna elements and the center and right hand antenna elements are in phase, there will be a maximum signal in the output sum channel, assuming that the antenna array is properly oriented and perpendicular to the signal source. At that time the variable delay element in the center antenna output line is adjusted to yield a zero phase difference between the two pairs of signals from the antenna elements. Therefore, the total power input appears at the sum channel output and no power appears at the difference channel output. The electrical phase delay inserted in the input lead from the center antenna element is equal to the phase lead due to the wave-front curvature. This is equivalent to a measurement of the range to the source, which may be determined by calibrating the phase shifter in terms of miles or distance rather than degrees. The antenna array is stopped, generally under servo-system control, when aimed at the signal source and then adjusted through the delay element to produce the range measuring null.

To eliminate the need for servo-system operation during signal search, the antenna array can be permitted to rotate at a constant rate and the delay element can be continuously varied at a rate higher than that of the antenna rotation so that during interval of the bearing maximum at least one range null can be obtained. For a continuous antenna rotation rate of 10 r.p.m. for example, this result can be effected with a delay scanning rate of about 20 kc., assuming the bearing null interval to be equivalent to 10 seconds of arc. For general operation, as in the X band of 8,000–12,000 megacycles for example, the minimum antenna spacing would be approximately 34 feet. Range is thus derived by the translation of the adjusted phase shift, from the degree reading required to provide the sum signal maximum and the difference signal null, into free space corresponding distance.

The phase shifter dial may be calibrated to read range directly in place of the phase shift, and this range is proportional to the degree of curvature of the signal front.

The invention will further be understood from the following description, when considered in relation to the accompanying drawings of certain embodiments thereof, and its scope is pointed out in the appended claims.

Figure 3:
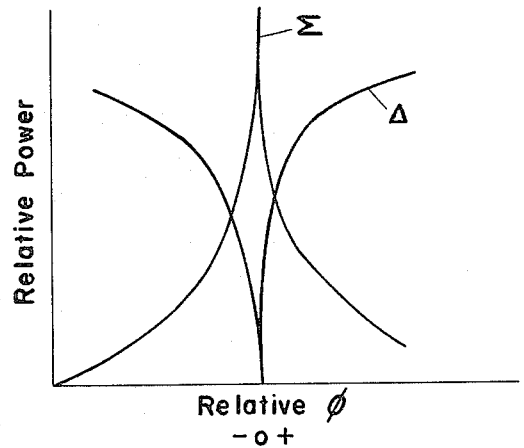
Figure 2:
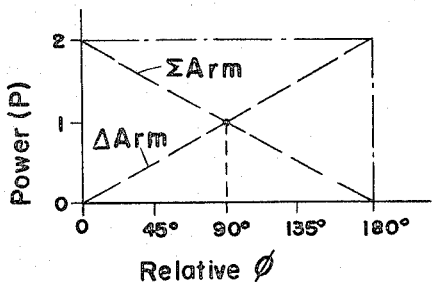
Figure 4:
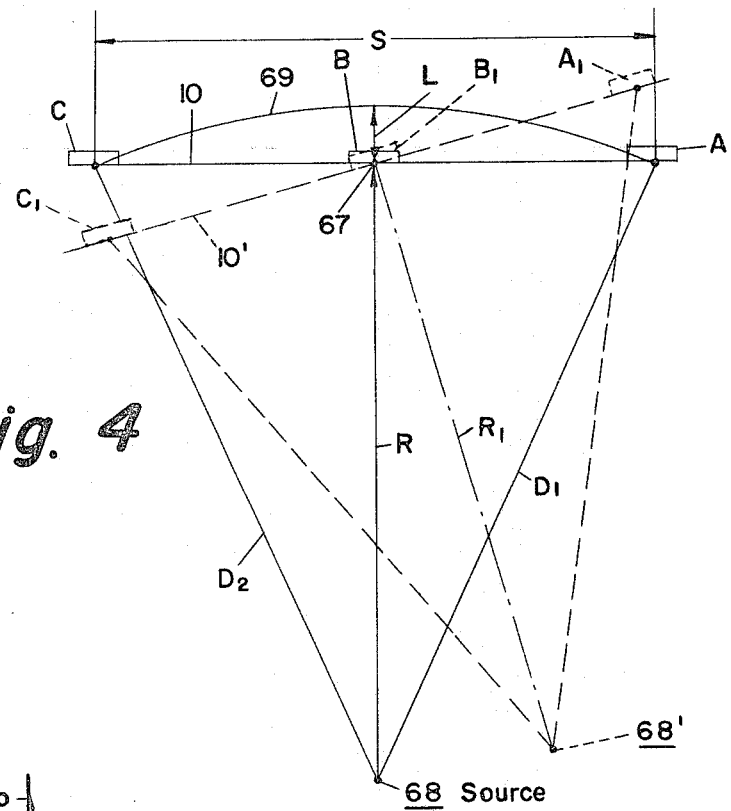
Figure 5:
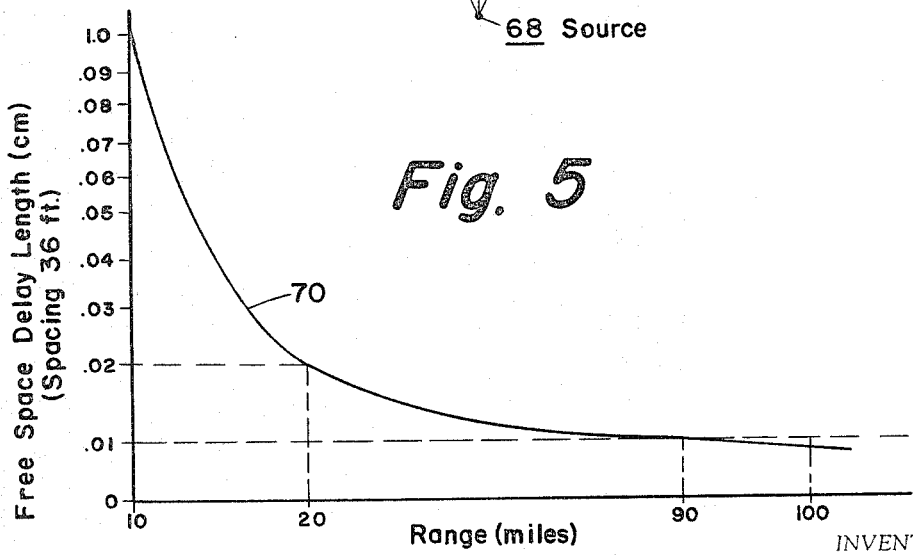

FIG. 1 is a rear view in perspective and schematic in form, showing a phase comparison or monopulse phase-contour ranging system embodying the invention, FIGS. 2 and 3 are graphs showing curves illustrating certain operating characteristics of the ranging system shown in FIG. 1, in accordance with the invention, FIG. 4 is a plan view diagrammatically indicating the antenna array of the system of FIG. 1 and its operating relation to a distant signal source and manner of determining range thereto in accordance with the invention, and FIG. 5 is a graph showing a curve related to the diagram of FIG. 4 and further illustrating the range finding operation of the system of FIG. 1.

Referring to the drawings, wherein like reference numerals and characters are used to designate like elements throughout the various figures, and referring particularly to FIG. 1, a triple-in-line paraboloid antenna array 8 comprising substantially like antenna elements A, B and C are provided with feed centers of the two outer or end antenna elements A and C, spaced or displaced from the center element B in the azimuth plane, as indicated by the line 9, to provide sum and difference functions in response to received signals, and a dual-channel receiver 10 having sum and difference detector elements 11 and 12 to yield sum and difference signals respectively.

The three antenna elements A, B, and C are coupled to the detector elements 11 and 12 through a coupling network or wave guide system 13 having a plurality of coupling elements 24, 25, 30, 45 and 53, of the electronic phase shifter or phase determining type, preferably of the hybrid-T or Magic-T type, connected for linearly combining in two groups of two, the signal output from the three antenna elements A, B and C for application to the detector elements 11 and 12 as above described.

Assuming the ranging system to be operating in a high frequency band such as the X-band of 8,000-12,000 mc., the antenna elements A, B and C are provided with signal output lines or wave guides 20, 21 and 22, respectively, extending in parallel relation from the feed centers thereof and connected for applying input signals to two hybrid-T or Magic-T devices 24 and 25 from the antenna elements A and B and from the antenna elements B and C, respectively, in two pairs or groups. To this end, the output lines 20 and 21 are connected respectively to the signal input arms 26 and 27 of the phase shifting and signal combining device 24, and the output lines 21 and 22 are connected respectively to the signal input arms 28 and 29 of the phase shifting and signal combining device 25, as shown. By this simplified means the signal output from the antenna array may be linearly combined in the two detectors 11 and 12 as will be described.

Since the center antenna element B is thus part of each group or pair, signals from the output line or wave guide 21 must be divided in its application to the two input arms 27 and 28. As a simplified and preferred signal dividing and phase shifting device, a third hybrid-T or Magic-T device 30 is provided in the connection between the output line 21 and the signal input arms 27 and 28 as indicated. This takes advantage of the reciprocal nature of the hybrid-T device 30 in that a signle source of energy is applied through the line 21 to what is effectively the sum signal output line 32 thereof and thus divides in half with signal output appearing at normal signal input arms here connected and substantially unitary with input arms 27 and 28. These divided signals have identical phases for the same respective linear distance away from the junction point of device 30 and thus provide for a balanced signal input to the two devices 24 and 25 for comparison and combining with signal input from the outer antenna elements A and C through the lines 20 and 22 respectively. To provide a proper balance in the signal levels applied to the devices 24 and 25 from all three antenna elements, due to the signal dividing at the device 30, signal attenuating devices may be inserted in the lines 20 and 22 from the outer antenna elements A and C as indicated at 35 and 36, respectively.

While other forms of electronic phase shifting and signal combining means may be utilized, the hybrid-T form is at present preferred for the elements 24 and 25 which are the main signal combining elements of the system. In the device 24, the signal input arms 26 and 27 are coupled to sum and difference signal output arms 37 and 38 respectively, and in the device 25 the signal input arms 28 and 29 are coupled to sum and difference signal output arms 39 and 40 respectively.

As is known, with phase shifting and signal combining devices of this type, a pair of coherent signal sources such as the antenna elements A and B or B and C, connected as in the present example for applying input signals to the arms 26 and 27 or 28 and 29 provide output signals from the sum and difference arms 37 and 38 or 39 and 40, respectively, in accordance with the relative phase of the signals. The total input power or energy is divided between the sum and difference arms whenever a phase difference exists. At zero phase difference, the total power input appears at the sum signal output arms 37 and 39. When the phase difference is 180° out, the total energy or power appears at the difference signal output arms 38 and 40.

The above condition is only true when the input power is both coherent and equal in level at the input arms. These signal levels are balanced either by the attenuators 35 and 36 or by making the antenna elements A and C a certain percentage smaller than the antenna element B, such as twenty-five percent smaller, or by making the antenna element B twenty-five percent larger, for example, than the outer elements A and C. The phase difference between the signals delivered by the outer lines or wave guides 20 and 22 with respect to the signals delivered by the center line or wave guide 21, is adjusted, in accordance with the invention, by inserting suitable phase shifting means in the output line 21 from the center antenna element B as indicated at 41. This may be provided with movable control means such as a rotary dial 42, for example, connected with the internal elements for effecting the phase shift in a single translation therethrough. This dial or indicating means may be calibrated to read in electrical degrees of phase shift or in some other unit more directly related to range as will hereinafter be discussed.

The sum signal output arms 37 and 39 of the main signal coupling devices 24 and 25, respectively, are coupled to a common sum signal output line or wave guide 44 through a fourth hybrid-T phase-shifting and signal-combining element or device 45. This device has the signal input arms 46 and 47 thereof coupled respectively with the sum signal output arms 37 and 39, and a sum signal output arm 48 coupled to the output line or wave guide 44. The difference signal output arm 49 is not used and is thus terminated, as is the difference signal output arm 50 of the device 30.

Likewise, the difference signal output arms 38 and 40 are coupled to a single difference signal summing and output line or wave guide 52 through a fifth phase shifting and signal combining device 53 of the hybrid-T type, having signal input arms 54 and 55 coupled with the difference signal output arms 38 and 40 respectively of the coupling devices 24 and 25. The sum signal output arm 56 is coupled to the output line or wave guide 52 as indicated. The unused difference signal output arm 57 is terminated as in the other two coupling devices 30 and 45.

The final two sum and difference signal output lines or wave guides 44 and 52 are coupled respectively to the sum signal detector 11 and the difference signal detector 12 of the receiving elements 10 of the system. The detected or rectified signal output from the detectors is then utilized for indicating the relative response of the two channels as the antenna array is moved to lie broadside to an incoming signal from a distant source. Generally the detector output voltage is the rectified signal and varies in amplitude with the signal amplitude applied to the detectors.

In the present example, output voltages from the detectors 11 and 12 are applied to a suitable indicator device 60 through output cable connections indicated at 61 and 62 respectively. The indicator device 60 may comprise two D.-C. volt meters 64 and 65 conected respectively with the cables 61 and 62 for indicating the magnitude of the sum and difference output voltages.

Referring now to FIGS. 2 and 3, along with FIG. 1, relative phase with respect to power or signal voltage output is shown graphically for the two main signal phase shifting and combining elements 24 and 25. In FIG. 2 it is seen that the power or signal output in the sum signal and difference signal arms 37 and 38 or 39 and 40, varies as the relative change in phase relation of the input signals is varied from zero to 180 electrical degrees. This variation is provided by the phase shift element 41 as the control element or dial 42 is rotated through its full operating range. This shows that the signal output is maximum in the sum signal output arm where the incoming or applied signals are in phase and is maximum in a difference signal output arm when the incoming or applied signals are 180° out of phase with each other.

The response curves in FIG. 3, plotted between the same characteristics, further indicate that the sum signal output is maximum at zero phase difference while the difference signal output is minimum or zero, and both change as indicated in FIG. 2 as the phase relation between the applied or incoming signals is varied therefrom in a positive or negative direction.

Referring now to FIG. 4 along with the preceding figures, further in accordance with the invention, range information R to an active source of radiation 68 is recovered by the simple expedient that if a broadside array of three equally spaced antenna elements A, B and C in line in a plane 10, is aimed at said source of radiation, the signal with which the center antenna element B will be excited will lead in phase that with which the outer or end elements A and C are excited. As long as the source 68 is a finite distance from the antenna array, the wave front of the incoming signal therefrom will be spherical at the array, and the detection of this phase lead will be equivalent to a measurement of the range to the source. Range and direction are both determined by the monopulse action of the system and thus the antenna array is made to rotate on a vertical axis, an indicated at 67, to a new position A1, B1 and C1, placing a new signal source location 68' along the range line R1 drawn from the center antenna element B1 to the source. Due to the curvature of the signal front this range is always shorter than the distances D1 and D2 of the end antenna elements A and C from the source.

Range and direction are thus simultaneously obtained through measurement of the curvature of the wave front 69. If an electrical phase delay equal to the phase lead due to the wave front curvature is inserted in the line 21 coupling the signal output from the center antenna element B, and contributions from the antenna elements are linearly combined in two groups of two, through the dual coupling elements 24 and 25 and their connected output circuits or wave guide elements, a simultaneous and equal output response will be obtained from the end antenna elements A and C when the source is exactly broadside to the array.

When the sum signals arising from the combination of antenna elements A and B and of antenna elements B and C (EΣ1 and EΣ2) are in phase, there will be a maximum in the combined sum signal output (EΣ3) in the combined sum signal output channel 48.

The variable delay element 41 in the center antenna output line 21 is adjusted to bring the output signals in phase as above and to provide a maximum signal output (EΣ3) in the common or combined sum signal output channel 48 as above described. At the same time, however, due to the inherent operating characteristic of the signal combining elements 24 and 25, difference signal output voltages (EΔ1 and EΔ2) in the difference signal output arms 38 and 40 respectively, are substantially zero, and therefore the combined difference signal output (EΣ4) in the combined difference signal output channel 52 is zero. The dial 42 is thus set to provide a maximum scale rating on the indicator element 64 and a minimum scale rating on the indicator instrument 65. The antenna array is thus stopped in its rotation when it is aimed at the desired signal source and then the delay element 41 is adjusted to provide the delay sufficient to produce the range measuring null.

Alternatively, the antenna array can be rotated at a constant rate and the delay element 41 can be continuously varied at a high rate compared to the antenna rotation so that during the interval the bearing maximum on a distant signal source, at least one range null can be obtained. This mode of operation eliminates the need for servo-system controls during search. For a continuous antenna rotation rate of 10 r.p.m., for example, this can be effected with a delay scanning rate of about 20 kc., assuming the bearing null interval to be equivalent to 10 seconds of arc. For the usual operating conditions the distance or range R to the signal source is considerably greater than the end antenna separation S as indicated in FIG. 4. Therefore, the equivalent free space distance L of the controllable delay element can be determined to be:

$$L \doteq \frac{S^2}{8R}$$

From this the following relationship can be found:

$$S_{min} = \left[ \frac{(8R\tau) \left| \frac{SL}{\tau} \right|}{\left| \frac{SR}{R} \right|} \right]^{1/2}$$

where
$\tau$ = wavelength of received signal
$SL/\tau$ = delay precision in wavelengths
$SR/R$ = overall range error
$S_{min}$ = minimum spacing of end antennas
To consider a specific application, let
$\tau$ = 3.3 cm. (X band) 8000–12000 mc.
$R$ = 100 miles
$SR/R$ = .10
$SL/\tau$ = 1/4000

The minimum antenna spacing would be about 36 feet.

Thus, when the antenna array is aimed at a source of radiation, the signal with which the center antenna element will be excited will lead in phase that with which the outer or end elements are excited. As long as the source is a finite distance from the antenna array, the wave front will be spherical at the array as indicated in FIG. 4 and detection of this phase lead will be equivalent to a measurement of the range to the source.

The variable phase delay element 41 serves to introduce an electrical phase delay equivalent to the phase lead due to the wave front curvature and corresponding to the distance L. The phase shift dial 42 may be calibrated to read range directly in place of phase shift. This range is thus proportional to the degree of curvature represented by the distance L, as above, which is actually the distance between the center antenna and the advanced front of the received signal contour or wave front 69. Range is thus derived by translating the adjusted phase shift from degree reading required to provide the EΣ3 maximum and the EΣ4 minimum readings simultaneously with the antenna array aimed at the distance source or exactly broadside thereto.

The free space delay length L with a spacing S between the end antenna elements A and C for different ranges to distant signal sources is indicated by the curve 70 in the graph of FIG. 5. For the antenna spacing indicated, this shows the manner in which the range is proportional to the degree of curvature represented by the distance L which is the distance between the center antenna B and the advanced front of the received signal contour or wave front 69. When the dial 42 of the variable delay element 41 is adjusted to bring the signals from the center antenna B into phase with the signals derived through the end antenna elements A and C for the proper null and maximum readings of the indicators 64 and 65, this distance or the corresponding range as derived from the curve 70 is then read on the dial in place of degrees.

From the foregoing description, it will be seen that a triple-in-line directional antenna system or array rotatable in the azimuth plane to face a distant signal source broadside is provided with the means for introducing electrical phase delay in the output from the center antenna element equal to the phase lead due to the wave front curvature of a received signal. The signals from the two outer antenna elements are linearly combined therewith in two groups of two for detection and indication by suitable voltage-responsive indicator devices. Hybrid-T devices are employed in the manner shown and described to convert the relative phase to relative energy so as to render signal processing to the realm of voltage comparison.

I claim:

1. In a phase-comparison signal ranging system, the combination of an antenna array comprising a plurality of in-line directional antenna elements equally spaced and mounted to rotate in the azimuth plane and face broadside a remote signal source and a spherical signal wave front resulting from signal transmission therefrom, means providing signal output connections from said antenna elements and equalized signal output therefrom, a variable phase delay element in the output connection from the center antenna element for introducing therein a phase delay equal to the phase lead of a received signal thereon, means including a pair of hybrid-T coupling devices connected for linearly combining the signal output from said center antenna element through said phase delay device with each of the adjacent antenna elements on opposite sides thereof to provide two equalized pairs of sum and difference output signals therefrom, means connected with said hybrid-T coupling devices for linearly combining and detecting said sum output signals and said difference output signals, thereby to convert relative phase to relative energy through said coupling devices and final relative voltages through said detecting means, and means responsive to said voltages connected with said combining and detecting means for indicating the relative amplitudes thereof as said phase delay device is adjusted to bring the signal output from said center antenna element into phase for maximum sum signal voltage output and minimum difference signal voltage output, and means for translating the adjusted phase shift from degree readings to free space distances from the antenna array to different signal sources as a base for measurement of range to said sources.

2. In a phase-comparison ranging system, the combination as defined in claim 1, wherein the antenna elements are of the paraboloid type and of coordinated sizes to provide said equalized signal output.

3. In a monopulse signal ranging system, the combination of an antenna array comprising three spaced in-line directional antenna elements mounted to rotate in the azimuth plane for alignment with and response to signal transmissions from distant sources in a spherical wave front at the array, a signal output line connected with the feed center of each of said antenna elements, a hybrid-T coupling device connected between the output lines of the center and one outside antenna element to receive the signal output therefrom and having sum and difference signal output arms, a second hybrid-T coupling device connected between the output lines of the center and other outside antenna element to receive the signal output therefrom and having sum and difference signal ouput arms, means connected between the sum signal output arms of said coupling devices for combining and detecting the signal output therefrom as a variable sum signal voltage, means connected with the difference signal output arms of said coupling devices for combining and detecting the difference signal output therefrom as a variable difference signal output voltage, voltage responsive indicating means connected with each of said last named means for comparing the relative amplitudes of said sum and difference signal output voltages, an adjustable phase-shift device in the signal output line from the center antenna element for introducing a phase delay in the signal output therefrom equal to the phase lead of a received signal from a distant source due to the spherical wave front curvature at the antenna array and a maximum sum signal output voltage, and means for indicating a measure of the phase lead and the range from the source corresponding thereto.

4. In a monopulse signal ranging system, the combination as defined in claim 3, wherein means are provided for attenuating the signal output from the antenna elements to effect a balance and equalization of the voltages applied therefrom to said hybrid-T coupling devices, and wherein an adjusting means for the phase delay device is calibrated to read range directly.

5. In a phase-comparison mono-pulse signal ranging system, the combination of an antenna array comprising spaced in-line directional antenna elements mounted to rotate in the azimuth plane and face broadside a remote signal source and a spherical signal wave front resulting from signal transmission therefrom, means including a plurality of hybrid-T networks in circuit relation for linearly combining the signal output from one antenna element with each of the immediately adjacent antenna elements on opposite sides thereof and deriving therefrom two equalized pairs of sum and difference output signals respectively from sum and difference hybrid-T networks which in part comprise said aforementioned, means including a further plurality of hybrid-T networks and separate sum and difference detectors for linearly combining and detecting said sum output signals and said difference output signals to convert the relative phase thereof to relative energy and final relative voltages through said detecting means, means responsive to said voltages for indicating the relative amplitudes thereof, an adjustable phase-shift device in the signal output line from the center antenna element for introducing a phase delay in the signal output therefrom equal to the phase lead of a received signal from a distance source due to the wave front curvature at the antenna array and a maximum sum signal output voltage, and means for indicating a measure of the phase lead and the range from the source corresponding thereto.

6. In a phase-comparison signal ranging system, the combination as defined in claim 5, wherein three antenna elements are provided and equally spaced, and wherein the means for indicating a measure of the phase lead and the range is provided in connection with the adjustable phase-shift device and includes an adjusting element therefor calibrated to read range directly therefrom.

7. In a phase-comparison mono-pulse signal ranging system, the combination of an antenna array comprising spaced in-line directional antenna elements mounted to rotate in the azimuth plane and face broadside a remote signal source and a spherical signal wave front resulting from signal transmission therefrom, a variable phase delay element directly connected with one antenna element for introducing a phase delay in the signal output therefrom equal to the phase lead of a received signal thereon, means for linearly combining the signal output from said one antenna element with each of the immediately adjacent antenna elements on opposite sides thereof to provide two equalized pairs of sum and difference output signals therefrom, means for linearly combining and detecting said sum output signals and said difference output signals to convert the relative phase thereof to relative energy and final relative voltages through said detecting means, means responsive to said voltages for indicating the relative amplitudes thereof, as said phase delay element is adjusted to shift the signal output from said one antenna element into phase for maximum sum and minimum difference signal voltage output, and means for translating the adjusted phase shift from degree readings to free space distance and arrange from the antenna array to different signal sources having different spherical wave fronts and phase leads in the received signals.

References Cited by the Examiner
UNITED STATES PATENTS

| | | | |
|---|---|---|---|
| 2,349,370 | 5/1944 | Orner | 340—16 |
| 2,717,380 | 9/1955 | Brooks | 343—113 |
| 2,736,019 | 2/1956 | Vogeley et al. | 343—7.4 |
| 2,962,714 | 11/1960 | Meixell et al. | 343—114.5 |

CHESTER L. JUSTUS, *Primary Examiner.*

RODNEY D. BENNETT, *Examiner.*

J. P. MORRIS, *Assistant Examiner.*